Figure 1:
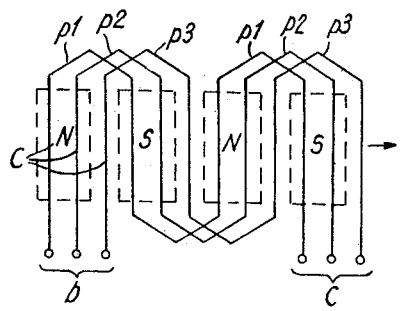

July 27, 1965

P. J. G. HETZEL 3,197,685

BISTABLE COMMUTATION SYSTEM FOR DYNAMO ELECTRIC
MACHINES UTILIZING ELECTRONIC SWITCHES

Filed Oct. 6, 1960

2 Sheets-Sheet 1

Legend [S-CS] = Semi-Conductor Switch

INVENTOR
PETER JOHN GRENVILLE HETZEL

ATTORNEY

INVENTOR
PETER JOHN GRENVILLE HETZEL

ATTORNEY

United States Patent Office 3,197,685
Patented July 27, 1965

3,197,685
BISTABLE COMMUTATION SYSTEM FOR DYNAMO ELECTRIC MACHINES UTILIZING ELECTRONIC SWITCHES
Peter John Grenville Hetzel, Dunchurch, Rugby, England, assignor to Associated Electrical Industries Limited, London, England, a British company
Filed Oct. 6, 1960, Ser. No. 60,881
Claims priority, application Great Britain, Oct. 6, 1959, 33,860/59
8 Claims. (Cl. 318—138)

This invention relates to dynamo electric machines.

In the most usual form of D.C. machine, armature conductors accommodated in peripherally distributed slots in a rotary armature are connected, in lap-wound or wave-wound formation, into a number of armature current paths from which connections are taken at appropriate positions to the segments of a commutator engaged by brushes to which the armature terminals of the machine are connected, each armature conductor being included in a series connection between two commutator segments and through them, via the brushes, between the armature terminals. The function of the commutator and brushes is to provide that, in respect of each armature conductor, the sense in which current flows through it is reversed with respect to the armature terminals as the conductor moves away from the influence of one field pole towards that of the next field pole of opposite polarity.

With a view to avoiding limitations imposed by the conventional use of a mechanical commutator, it is proposed in copending application Serial No. 805,812, now Patent No. 3,025,443, to provide commutating switching by means of semi-conductor switching devices which are arranged to be alternated between a conductive ("on") state and a substantially non-conductive ("off") state in synchronism with rotation of the machine and with a timing and in a sequence appropriate to producing, in the individual armature conductors of the machine, periodic current flow in appropriate direction having regard to the instantaneous positions of these conductors in relation to the magnetic field poles of the machine.

Thus, in one embodiment described in said copending application each armature current path constituted by the armature conductors is associated with four semi-conductor switching devices of which two are connected at opposite ends of the path and are arranged to be conductive together to establish current flow through the path in one direction, while the other two switching devices, also connected at opposite ends of the path, are arranged to be conductive together when the first two are non-conductive thereby to establish current flow through the path in the opposite direction. In such an arrangement the four switching devices may be considered as being connected as a switching bridge between two diagonally opposite corners of which the armature current path is connected, the remaining two corners being connected to the respective armature terminals and the two switching devices in each pair of opposite arms of the bridge being operable together, alternately with the switching devices in the other two arms.

In another embodiment described in said copending application each armature current path is switched to carry current in one direction only and at such times that each conductor of the path, considered individually, is always under the influence of the same polarity of field when the path is so switched. In this case each armature path may be paired with a similar, alternately switched, path which has its conductors located adjacent to those of the first path, for instance in the same slots, and is connected to carry current in the opposite direction when switched by its own switching device. Two such paths may be considered as being substantially the electrical equivalent of a single path in which the direction of current flow can be reversed, but only two switching devices are required instead of the four required in the first embodiment.

In these embodiments of the invention of said copending application, each armature current path, with its switching devices, is independent of the others and is connected in parallel with the others across the armature terminals.

Consequently, during the time that the conductors of any particular armature path are passing between poles and are therefore producing little or no E.M.F. to oppose the voltage at the armature terminals it is necessary to temporarily disconnect that path from the armature terminals: this is achieved by arranging that, in reversing the states of the associated switching devices to reverse the direction of current flow in the path, there is a significant intervening interval during which all of the switching devices associated with the path are non-conductive together. It is therefore not possible, as would be convenient, to arrange the switching devices in bistable combinations in which the conditions of the switching devices are reversed substantially instantaneously and for which the timing requirements would be more easily met.

According to the present invention, there is provided in combination with a dynamo electric machine having a plurality of armature current paths each comprising a plurality of armature conductors so disposed that these paths, each considered as a whole, will pass between poles at different times, a commutating switching arrangement comprising a plurality of semi-conductor current switching devices which are operable in pairs, the operation of a pair consisting of substantially instantaneous reversal of the states of the devices of the pair, the one from an existing "on" state to the "off" state and the other conversely, and timing means for effecting in synchronism with operation of the machine timed operations of the switching devices by which, at such times as any particular armature path is passing between poles, that path is reconnected for reverse direction of current flow without establishing between the armature terminals of the machine for any significant interval a series-connection of armature conductors including only the conductors of the path then passing between poles. It therefore becomes possible to arrange the switching devices for operation as bistable pairs, while effectively avoiding the establishment between the armature terminals of a connection of armature conductors in which no E.M.F. is being produced to oppose the voltage at these terminals. The establishment of such a connection can be avoided, as will appear hereinafter, by arranging that at least immediately before and immediately after the reversal of current flow for a particular path, that path is connected in series with at least one other armature path which is then under the influence of the field poles. To this end the switching devices may be so interconnected with the armature current paths that each path is permanently in series with another or that operation of the switching devices to effect reversal of current flow for a particular path, results in that path being temporarily excluded from a series connection of the armature paths between the armature terminals; alternatively operation of the switching devices to effect current reversal for a particular path may establish immediately before and after such reversal a temporary series connection of that path with at least one other path.

Reference herein to reversal of current flow direction in respect of an armature current path is to be construed, unless the context shows otherwise, as covering not only such reversal in respect of a single path, but also the interruption of one path and the establishment of current flow in the reverse direction in another path lying adjacent to the first so that, as aforesaid, the two paths are substantially the electrical equivalent of a single, reversible path.

The reversal of the direction of current flow may involve the operation of one or more pairs of switching devices depending on the particular manner of their interconnection with the armature current paths. Where only one pair is involved the connection for reverse current flow is established immediately by the reversal of the states of the two switching devices concerned. Where more than one pair is involved, these pairs may be operated together, in which case immediate establishment of the reverse connection is again obtained, or may be operated in succession in such manner that the reversal of connection takes place with one or two intervening steps as will appear hereinafter.

Figure 2:
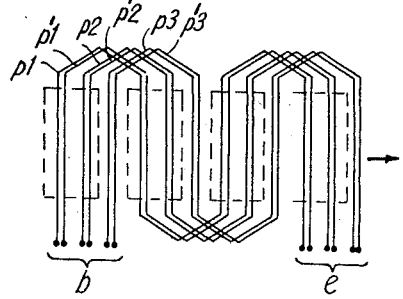
Figures 3, 4:
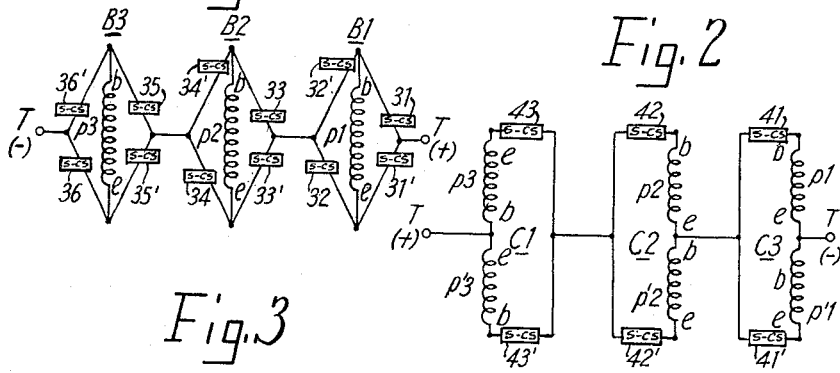
Figure 5:
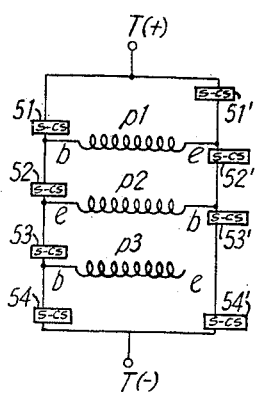
Figure 6:
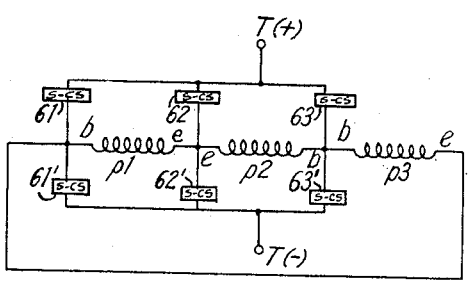
Figure 7:
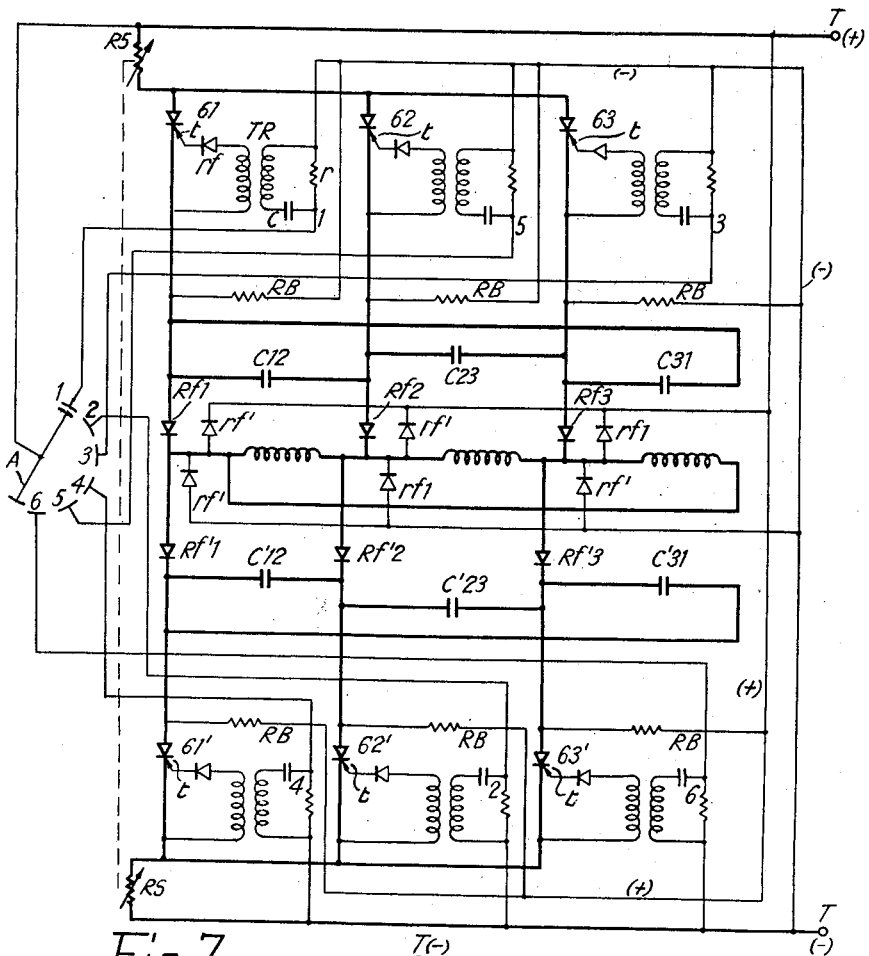
Figure 8:
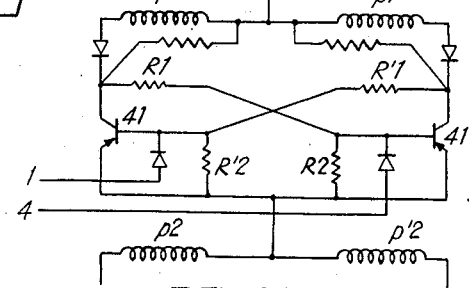

In the accompanying illustrative and exemplary drawings:

FIGS. 1 and 2 illustrate two different armature path arrangements for a dynamo electric machine to which the present invention can be applied, the armature and field systems of the machine being shown schematically in a conventional manner, FIG. 3 illustrates diagrammatically, for an armature path arrangement as in FIG. 1, a commutating switching arrangement embodying the invention, FIG. 4 diagrammatically illustrates such a switching arrangement for an armature path arrangement as in FIG. 2, FIGS. 5 and 6 diagrammatically illustrate for an armature path arrangement as in FIG. 1 other commutating switching arrangements embodying the invention, FIG. 7 illustrates with conventional circuit symbols a practical embodiment of the switching arrangement of FIG. 6, this embodiment also serving to indicate how the embodiments of FIGS. 3 and 5 may be constructed in practice, and FIG. 8 illustrates with conventional circuit symbols the basis of a practical embodiment of the switching arrangement of FIG. 4.

In FIG. 1 armature conductors $c$ lying in periphery distributed armature slots (not shown) are interconnected in wave-wound formation into three armature current paths $p1$, $p2$ and $p3$, this number having been chosen purely by way of example. Field poles of the machine, assumed to be four in number, are indicated by the rectangles marked N and S, and it will be noted that the conductors $c$ constituting any one of the paths $p1$, $p2$, $p3$ are a pole pitch apart. Consequently the conductors constituting any particular path will all be passing between poles at the same time, but at different times from the conductors of the other paths. Thus in the relative positions shown, the conductors of path $p3$ are passing between poles while those of paths $p1$ and $p2$ are under the influence of the poles. The arrow indicates an assumed direction of movement of the armature relatively to the poles. The beginnings and ends of the paths $p1$, $p2$ and $p3$ are marked $b$ and $e$ respectively.

In FIG. 2 there is a similar arrangement of paths $p1$, $p2$, $p3$ but each of these paths is paired with another path $p'1$, $p'2$, $p'3$, the conductors of each pair being electrically adjacent to each by being accommodated for instance in the same slots.

In the remaining figures the armature paths are conventionally represented as windings or coils carrying the same references ($p1$, etc.) as in FIGS. 1 and 2 and having their ends similarly marked $b$ and $e$ where necessary. In FIGS. 3-6 the position of semi-conductor current switching devices used for effecting commutating switching in accordance with the invention, are marked simply by a cross ($\times$). The nature of these devices will be considered later: for the time being it is sufficient to note that they are devices which by the application of appropriate controlling potential can be switched between a substantially non-conductive "off" state in which they pass negligible current and a conductive "on" state in which they present a low impedance to current flow through them.

In the embodiment of FIG. 3 the armature current paths $p1$, $p2$, $p3$ are connected between opposite corners of respective switching bridges B1, B2, B3 each having a semi-conductor current switching device in each arm; these switching devices are indicated at 31, 31', 32, 32', for bridge B1, at 33, 33', 34, 34' for bridge B2, and at 35, 35', 36, 36' for bridge B3. The three bridge circuits are connected in series with each other, at their remaining corners, between the armature terminals $T(+)$ and $T(-)$ of the machine. The switching devices in adjacent arms of each bridge are arranged as a bistable pair, that is one is "on" when the other is "off" and vice versa, and each such pair of devices (e.g., 31 and 31' of bridge B1) is operated at the same time as, but in converse sense to, the devices (e.g., 32 and 32') in the two other arms of the same bridge. With one switching device from each pair in the conducting "on" state and the remaining devices in the "off" state, a series connection of the armature paths $p1$, $p2$, $p3$ is established between the armature terminals T, the direction of current flow in each path being determined by the particular switching devices which are conductive in the relevant bridge. For instance with devices 31, 32, 33, 34, 35 and 36 in their "on" state all three paths would have current flowing through them from beginning ($b$) to end ($e$).

Means functioning in synchronism with rotation of the machine (such means not being shown in FIGS. 3–6 but examples thereof being given in FIG. 7 and in said copending application Serial No. 805,812, produces operation of the several pairs of switching devices with such timing that in each bridge all four switching devices are changed to their opposite state, that is, "on" to "off" or "off" to "on" as the case may be, as the conductors constituting the armature path of that bridge are passing from one field pole to the next. As a result, the direction of current flow through this armature path is reversed in accordance with the operational requirements of the machine. For example when the armature paths are occupying the relative positions shown in FIG. 1, that is, with the path $p3$ passing between poles, the timing means would cause both pairs of switching devices 35, 35' and 36, 36' in bridge B3 to be operated to their opposite states, so that with devices 35' and 36' now conductive, current will then flow through path $p3$ from end ($e$) to beginning ($b$). Later, when path $p2$ is passing between poles its current will be reversed by timed operation of devices 33, 33' and 34, 34', and so on. The current reversal takes place substantially instantaneously so that the current flow in the other paths is not significantly interrupted or otherwise affected.

In the arrangement of FIG. 4, for which the armature current paths are arranged in pairs according to FIG. 2, the armature paths in each pair are connected in parallel with each other with a semi-conductor current switching device connected in series with each. Thus paths $p1$ and $p'1$ are connected in parallel with each other, each having a switching device, 41 or 41' in series with it, while paths $p2$ and $p'2$ are likewise associated with switching devices 42 and 42', and paths $p3$ and $p'3$ with devices 43 and 43'. The several parallel connections thus formed (C1, C2, C3) are connected in series with each other between the armature terminals T, it being noted that the sense in which each parallel connection is connected in the series connection is immaterial provided that the paths p1, p2, p3 are connected in appropriate sense. To illustrate this, C3 has been shown connected in opposite sense to C1 and C2. With one switching device of each pair "on" and the other "off," it is obvious from FIG. 4 that there exists between the armature terminals a series connection including one armature path from each pair of paths. Timed operation of the switching devices is effected in such manner that as any particular pair of paths is passing between poles of the machine (for example paths p3 and p'3), the switching devices for these paths (43 and 43' in the example) are operated to their opposite states, so that an effective reversal of the direction of current flow is obtained in this pair of paths. That is, if device 43 is initially "on" and device 43' "off," current will initially be flowing in path p3 from beginning (b) to end (e) and after reversal of the states of devices 43 and 43' will be flowing in path p'3 from end (e) to beginning (b). As before, this effective current reversal is achieved without significantly interrupting or otherwise affecting the current flow in the other pair of paths.

In each of these first two embodiments of the present invention the armature paths are connected in series between the terminals T at all times and this means that while one path is between poles and producing no E.M.F. it is protected by the other paths by virtue of the E.M.F.'s then being generated in them to oppose the armature voltage. It may be mentioned that the series connection also gives the possibility of using other armature winding arrangements which in known manner achieve a reduction of tooth ripple and of the effects of non-uniform fields under the poles. In addition to these advantages the substantially instantaneous reversal of the states of the appropriate switching devices means that at any time one pair of the switching devices associated with any armature path in the case of the FIG. 3 embodiment, or one of the switching devices associated with any pair of armature paths in the case of the FIG. 4 embodiment, is in the conductive "on" state. The timing requirements may therefore be met rather more easily than in the embodiments described in said copending application in which, during current reversal in any particular armature path, there has to be an interval in which the switching devices associated with that path are all non-conductive together.

In the embodiment of the invention illustrated by FIG. 5, which relates to the armature path arrangement of FIG. 1, the number of switching devices required in relation to the number of armature current paths is reduced as compared with the embodiment of FIG. 3. In FIG. 5 the semi-conductor current switching devices are connected in two chains, 51–54 and 51'–54', each having one more device (four in the illustrated example) than the number of armature paths (three in the example). These two chains of switching devices are connected in parallel between the armature terminals T, and each armature current path p1, p2, p3 is connected between the junction of two of the devices in one chain (e.g., 51 and 52 for path p1) and the junction of the two corresponding devices (51' and 52' for p1) in the other chain. The switching devices are again arranged for timed operation in pairs, each pair being a particular device in one chain (e.g., 51) and the corresponding device (e.g., 51') in the other chain. The timing of the operation of the switching devices is so organised that at any time all but one of the paths p1, p2, p3 are connected in series with each other through switching devices, one in each pair, in their "on" states, this series connection again affording the possibility of reducing cyclical E.M.F. variation: the remaining path is excluded from the series connection by arranging that the switching devices which are "on" include the two switching devices to the junction of which one end of that path is connected. Each path is thus excluded when it is passing between poles: thus when path p2 is between poles the states of the switching devices may be 51, 52', 53' and 54 "on," with the others "off," or vice versa: in either case, the "on" states of devices 52' and 53', or 52 and 53 as the case may be, result in path p2 being excluded from a series connection then established between the terminals T through paths p1 and p3. As the excluded path begins to enter the influence of the poles again, one of the excluding devices (e.g., 52' for path p2) and the correspondingly positioned device 52) in the other chain are reversed in state, that is, they are operated to their "off" state and "on" state respectively. This results in the re-establishment of current flow through the path (p2) that was excluded, the direction of this current being now the reverse of what it previously was. It also results in the exclusion from the series connection of another of the armature paths as it is passing between the poles: thus taking the above example, operation of device 52 to its "on" state instead of 52' results in exclusion of path p1 because then devices 51 and 52 are both "on." Table I shows the sequence in which the switching devices are operated and the current flow resulting from each different combination of devices in their "on" states. The direction of current flow is represented as (b–e) or (e–b), meaning beginning-to-end or end-to-beginning respectively: zero (0) current flow indicates exclusion of the path from the series connection between the terminals. It will be noted that the two pairs of devices at opposite ends of the chains, namely 51, 51' and 54, 54' have to be operated together.

*Table 1*

| Devices 'ON' | | | | Current flow | | |
|---|---|---|---|---|---|---|
| | | | | p1 | p2 | p3 |
| 51 | 52' | 53 | 54 | b–e | b–e | 0 |
| 51 | 52' | 53' | 54 | b–e | 0 | e–b |
| 51 | 52 | 53' | 54 | 0 | e–b | e–b |
| 51' | 52 | 53' | 54' | e–b | e–b | 0 |
| 51' | 52 | 53 | 54' | e–b | 0 | b–e |
| 51' | 52' | 53 | 54' | 0 | b–e | b–e |
| 51 | 52' | 53 | 54 | b–e | b–e | 0 |

The embodiment of FIG. 6 also requires a reduced number of switching devices, as compared with FIG. 3, in relation to the number of armature current paths involved. Here the several armature paths p1, p2, p3 are connected in a closed chain and each junction point in the chain is connected to both armature terminals T through respective semi-conductor current switching devices. Thus the junction between paths p1 and p2 is connected to terminal T(+) through switching device 62 and to terminal T(−) through device 62' while devices 61 and 61' are likewise associated with the junction between p1 and p3, and 63 and 63' with the junction between p2 and p3. It is arranged that, at any time, the two switching devices connected to one of the junctions are both in their "off" state, while of the two switching devices connected to each other junction, one of them is in its "on" state and the other is "off." It is also arranged that, going round the chain, the conductive devices are alternately on the (+) and (−) sides of the junctions to which they are connected. Thus if devices 63 and 63' at the junction between paths p2 and p3 are both "off," and if device 61 on the (+) terminal side of the junction between p3 and p1 is "on" (61' being "off"), then at the junction between p1 and p2 device 62' on the (—) terminal side will be "on." As a result of this arrangement (which like the other embodiments can be extended for other numbers of armature path), all but two of the paths are each connected alone between the armature terminals, whilst the remaining two armature paths, being those at whose junction both switching devices are in their "off" state, are connected in series with each other between the armature terminals T. For instance with devices 61 and 62' in their "on" states as in the example above, paths p3 and p2 are connected in series, whereas path p1 is connected alone across the terminals. In the FIG. 6 embodiment each successive switching action is such as to operate as a pair, and thereby reverse the states of, the conductive switching device at the junction next to that at which neither switching device was conductive, and the switching device connected between this latter junction and the same armature terminal. Thus starting with devices 61 and 62' in their "on" states as in the example above, the next timed operation would reverse the states of, say, devices 61 and 63 both connected to terminal T(+), device 63 being at the junction at which both devices 63 and 63' were previously "off" and device 61 being at the next junction round the chain. As a result of each switching action, one (p3) of the two serially connected armature paths (p3 and p2) is re-connected directly across the armature terminals T without reversal of its current, the current in the other (p2) of these two armature paths is reversed, and the next armature path in the chain (p1) is connected in series with this latter path (p2). The switching actions are timed to take place as the armature path in which the current is reversed is passing between poles.

The embodiment of FIG. 6 is applicable where there is an odd number of armature current paths for inclusion in the closed chain. Table II shows the operating sequence and successive connections of the armature paths for this embodiment.

*Table II*

| Devices 'ON' | | Current flow | | |
|---|---|---|---|---|
| | | p1 | p2 | p3 |
| 61 | 62' | b–e | b–e | e–b |
| 63 | 62' | b–e | b–e | b–e |
| 63 | 61' | e–b | b–e | b–e |
| 62 | 61' | e–b | e–b | b–e |
| 62 | 63' | e–b | e–b | e–b |
| 61 | 63' | b–e | e–b | e–b |
| 61 | 62' | b–e | b–e | e–b |

The switching devices may in each case of the foregoing embodiments be constituted for instance, by controlled semi-conductor diodes (so-called controlled rectifiers or "trigger diodes"), semi-conductor triodes (transistors) or photo-sensitive versions of any of these. The switching actions may be controlled in synchronism with rotation of the machine by appropriately timed control signals derived from instance in the manner to be described in connection with FIG. 7 or in a manner similar to that described in the said copending application.

Moreover, as has already been indicated, since the switching devices are operated in pairs, it is possible to arrange them as bistable pairs thereby simplifying their operating requirements. If required, each switching device may be included in more than one bistable circuit, as in the embodiment of FIG. 6 in which each switching device is paired for operation with different ones of the other devices at different times.

It is thought that those versed in electronic circuitry employing transistors or trigger diodes or such-like devices will readily be able to envisage practical circuits for the embodiments described, various forms of bistable connections of such switching devices being well-known in the art. However, by way of specific example two practical circuit arrangements for the embodiments of FIGS. 6 and 4 respectively, the one using trigger diodes and the other transistors, will now be described with reference to FIGS. 7 and 8. The circuitry of FIG. 7 will also indicate the lines on which the embodiments of FIGS. 3 and 5 could be put into practice.

Referring to FIG. 7 the three armature current paths p1, p2, p3 are shown interconnected with each other and with trigger diode switching devices 61, 62, 63, 61', 62', 63' in the same manner as already described in connection with FIG. 6. In series with each trigger diode is a rectifier Rf1, Rf2, Rf3, Rf1', Rf2', Rf3' and each trigger diode on one side of each junction between the armature paths P1, P2 and P3 is paired with its neighbours by cross-connections constituted by capacitors C12, C23, C31, C'12, C'23, C'31 connected between the junctions of the trigger diodes with their respective rectifiers. As is known a trigger diode can be rendered conductive by an appropriate operating potential applied to its trigger electrode, and will remain conductive even after removal of this operating potential until the voltage across the diode is removed or reduced below a critical value. In the arrangement shown, if any one of the trigger diodes is rendered conductive the resulting change of potential at its junction with its series rectifier will be applied over the capacitors connected to that junction and will thereby so reduce the voltage across the neighbouring trigger diodes to such an extent as to extinguish whichever one of them may have been conducting beforehand. For instance if diode 61 was originally conducting then on diode 63 being rendered conductive by an appropriate potential to its trigger electrode, the coupling afforded by capacitor C31 will cause diode 61 to extinguish. Diodes 61 and 63 are thereby operated as a bistable pair. Each of them is likewise individually connected in a bistable pair with diode 62, and the same applies to diodes 61', 62', 63'.

The timed operation of the trigger diodes can be effected for example under control of a timing device comprising a contact arm A rotating synchronously with the machine and engaging fixed contacts 1–6 in sequence. The trigger electrode of each of the trigger diodes is connected to a trigger pulse generating circuit comprising, as for diode 61, a transformer TF having its secondary winding connected to the trigger electrode t via a rectifier rf, and its primary winding connected over a differentiating circuit c–r to a particular one of the timing device contacts 1–6 according to the numbering shown. As the arm A comes into engagement with a particular contact, say contact 1, the differentiating action of c–r in the pulse generating circuit of diode 61 produces in the primary of transformer TR a pulse which is transferred to its secondary and is thereby applied over rectifier rf with appropriate polarity to render diode 61 conductive. As the arm A rotates the trigger diodes will be fired in a sequence which for the connection shown in FIG. 7 will be that required according to Table II.

In the circuit of FIG. 7 resistors RS are provided to absorb the terminal voltage on starting and at low speeds, when the back E.M.F. developed in all the armature current paths will be low even when they are under the influence of the field poles. Rectifiers rf' are included to discharge switching transients which may be induced in the armature current paths. In order to ensure proper switching of the trigger diodes at low speeds, when the induced voltages in the armature current paths will be low, bleed resistors RB are included to permit under these conditions the charging of the capacitors C necessary for the switching action. Rectifiers Rf1 . . . Rf'3 prevent short circuiting of the capacitors by the armature current paths in the condition of low induced voltage.

It will be noticed that in FIGS. 3 and 5, as in FIG. 6, each of the armature current paths P1, P2 and P3, considered individually, has its opposite ends connected towards one of the armature terminals through respective switching devices that are operated as a pair, and towards the other armature terminal through two further switching devices also operated as a pair. Take path P1 for instance: its opposite ends $b$ and $e$ are connected towards terminal T(+) through respective switching devices 31, 31' in FIG. 3, 51, 51' in FIG. 5 and 61, 61' in FIG. 6, and towards T(−) through respective switching devices 32', 32 in FIG. 3, 52, 52' in FIG. 5 and 62, 62' in FIG. 6. It is clear therefore that the embodiments of FIGS. 3 and 5 may be constructed in practice using as a basis the circuit organisation associated with each individual armature path in FIG. 7: the timing of the operation of the switching device has to be different of course, but this involves no difficulty, requiring only different connections to the timing device.

For the embodiment of FIG. 4 a circuit organisation based on FIG. 8 can be employed, this latter figure showing also the use of transistors instead of trigger diodes. FIG. 8 shows a circuitry associated with one of the pairs (p1 and p'1) of the armature current paths in FIG. 4, similar circuitry being associated with each of the other pairs of paths. In FIG. 8 transistors 41 and 41' have the paths P1 and P'1 respectively connected in series with them, and each transistor has its collector cross connected to the base of the other transistor by a potential dividing resistance chain R1, R2 or R'1, R'2. With one of the transistors conducting and the other non-conducting, the transistors can be changed to their reverse states by the application to the base of the conducting transistor, over a connection such as 1 or 4 from the timing device, of a (positive) potential which cuts off this transistor so that its collector potential becomes negative and by reason of the cross-coupling drives the other transistor into conduction. Current therefore flows in whichever one of the paths P1 and P'1 is connected in series with the transistor that is for the time being conductive.

What I claim is:

1. In combination with a dynamo-electric machine having armature terminals, field poles, and a plurality of armature current paths so disposed that considering each of them as a whole they will pass between field poles of the machine at different times, a commutating switching arrangement comprising a plurality of pairs of semi-conductor switching devices, at least one pair of said switching devices connected in current-reversing association with each armature path, bistable connections between the switching devices of each such pair to operate said switching devices substantially instantaneously from a condition in which one device of the pair is "on" and the other is "off" to a condition in which these states are reversed, the current direction in each path being reversible by such paired reversal of the devices associated therewith, connections interconnecting the armature paths and switching devices in an overall organization including in respect of each armature path series connections thereof establishable by the switching devices through at least one other of the armature paths, and synchronous timing means connected to the switching devices for effecting timed operations of the pairs thereof in a predetermined sequence effective to reverse the current direction of each armature path during its passage between poles while establishing a series connection of said path with another path at least immediately before and immediately after such reversal.

2. A combination of dynamo-electric machine and commutating switching arrangement as claimed in claim 1 wherein said timing means is connected to the switching devices for effecting operation of the pairs thereof in a predetermined sequence by which for the reversal of current direction in each armature path that path is temporarily excluded from a series connection of the armature paths between the armature terminals and the particular armature path.

3. A combination of dynamo-electric machine and commutating switching arrangement as claimed in claim 1 wherein said timing means is connected to the switching devices for effecting operation of the pairs thereof in a sequence by which immediately before and immediately after the reversal of current direction in each armature path a series connection of that path with at least one other armature path is temporarily established between the armature terminals.

4. A combination of dynamo electric machine and commutating switching arrangement as claimed in claim 1 wherein the armature paths are permanently connected in series through the switching devices.

5. A combination of dynamo electric machine and commutating switching arrangement as claimed in claim 1 wherein the armature paths are connected between opposite corners of respective bridge circuits each having one of said semi-conductor switching devices in each arm, these bridge circuits being connected in series with each other at their remaining corners and the switching devices in the bridge arms adjacent each of said remaining corners in each bridge being connected for timed operation as a pair at the same time as the other pair of switching devices of the same bridge and at such times as the path connected in the bridge is passing between poles.

6. A combination of dynamo electric machine and commutating switching arrangement as claimed in claim 1 wherein the armature current paths are arranged in adjacently located pairs and the armature paths of each pair are connected in parallel with each other with one of the semi-conductor switching devices in series with each path, the several parallel connections of armature path pairs being connected in series and the switching devices in each such parallel connection being connected for timed operation as a pair at such time as the associated pair of armature paths is passing between poles.

7. A combination of dynamo electric machine and commutating switching arrangement as claimed in claim 1 wherein the semi-conductor switching devices are interconnected to form two parallel connected series chains thereof, each such chain having one more switching device than the number of armature current paths, and the armature paths are connected between the chains, each between the junction of two of the devices in one chain and the junction of the two corresponding devices in the other chain, corresponding switching devices from the two chains being connected for timed operation as a pair and the several pairs being arrranged for operation in such sequence and with such timing that as any particular path is passing between poles the switching devices which are in their "on" states in the several pairs establish between the armature terminals a series connection of the armature paths excluding that particular path.

8. A combination of dynamo electric machine and commutating switching arrangement as claimed in claim 1 wherein the armature paths are connected in a closed chain and each junction point between paths has two of the semi-conductor switching devices respectively connected between it and the armature terminals, each such switching device, according to the particular junction and armature terminal between which it is connected, having cross-connections connecting it in respective bistable pairs with one and the other of the switching devices correspondingly connected between the same terminal and the adjacent junctions in the chain, the timing means being connected to the switching devices for effecting the timed operations thereof in such sequence that at any time both the devices associated with one junction in the chain are in their "off" states, while one of the switching devices associated with each other junction of the chain is in its "on" state, the "on" devices at successive ones of said other junctions being alternately on the one side and the other thereof with respect to the armature terminals.

References Cited by the Examiner

UNITED STATES PATENTS

| | | | |
|---|---|---|---|
| 1,873,966 | 8/32 | Kern | 318—138 |
| 2,866,144 | 12/58 | Kern | 318—138 |
| 3,067,370 | 12/62 | Quittner | 318—254 |
| 3,124,733 | 3/64 | Andrews | 318—254 X |

ORIS L. RADER, *Primary Examiner.*

MILTON O. HIRSHFIELD, *Examiner.*